United States Patent [19]

Hanaway

[11] Patent Number: 5,290,107
[45] Date of Patent: Mar. 1, 1994

[54] GUIDE POST, GUIDE SLEEVE AND IMPROVED AIR IMPULSE ROTARY BALL CAGE ASSEMBLY

[76] Inventor: Ronald L. Hanaway, Farmington Hills, Mich.

[21] Appl. No.: 950,284

[22] Filed: Sep. 24, 1992

[51] Int. Cl.⁵ ............................................. F16C 29/04
[52] U.S. Cl. ................................................... 384/49
[58] Field of Search ............... 384/49, 30, 40, 8, 25, 384/48

[56] References Cited

U.S. PATENT DOCUMENTS

| | | | |
|---|---|---|---|
| 2,422,775 | 6/1947 | Conner | 164/118 |
| 2,774,430 | 12/1956 | Blazek | 164/118 |
| 2,846,278 | 8/1958 | Blazek . | |
| 2,987,348 | 6/1961 | Blazek . | |
| 3,092,425 | 6/1963 | Connor . | |
| 3,357,755 | 12/1967 | Danly . | |
| 3,514,166 | 5/1976 | Coley . | |
| 3,752,540 | 8/1973 | Bosworth . | |
| 4,648,727 | 3/1987 | O'Neil et al. | 384/49 |
| 4,664,534 | 5/1987 | Hanaway | 384/49 |
| 5,054,937 | 10/1991 | Hanaway | 384/49 |

Primary Examiner—Lenard A. Footland
Attorney, Agent, or Firm—Dykema Gossett

[57] ABSTRACT

In combination, a guide post, a coaxial ball bearing cage adjustably receiving the guide post and adapted for longitudinal and rotary movements. A coaxial guide sleeve upon a support adjustably receives the cage and post. An apertured cap or ring upon the sleeve loosely receives and rotatably supports the cage. An inlet on the cap is adapted for connection to a pressurized air source. Pressurized air is directed into the cap for angular impingement upon the cage for rotating the cage relative to the sleeve.

19 Claims, 1 Drawing Sheet

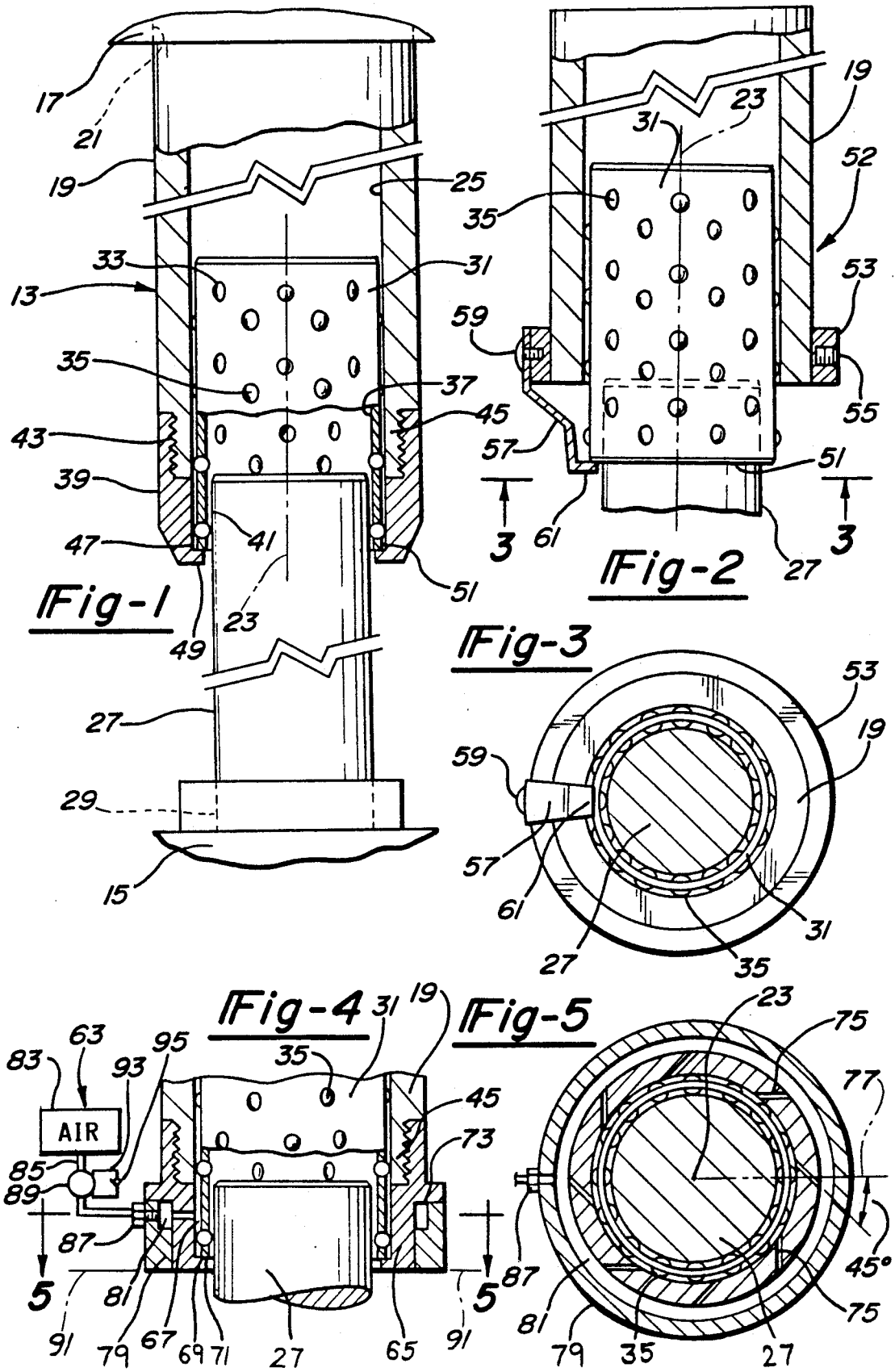

GUIDE POST, GUIDE SLEEVE AND IMPROVED AIR IMPULSE ROTARY BALL CAGE ASSEMBLY

FIELD OF THE INVENTION

The present invention relates to the assembled guide post, guide sleeve and ball bearing cage, such as may be used with a die set assembly.

BACKGROUND OF THE INVENTION

In the guide sleeve, guide post and bearing assembly of U.S. Pat. No. 4,664,534 dated May 12, 1987, of the present inventor, one disadvantage of that construction was the lack of predictability and extent of relative rotary movement of the ball cage with respect to the guide post to prevent tracking of the balls along the surface of the guide post and guide sleeve.

In said earlier patent, possibly others, as for example, U.S. Pat. No. 4,648,727, it was believed advantageous to have some relative rotary movement of the ball cage with respect to the guide post and sleeve. This related to rotation of the ball bearing assembly with respect to the axially related guide post and the external guide sleeve to avoid tracking thereupon by the bearings.

THE PRIOR ART

Listed below are additional patents relating to the general combination of a guide post, guide sleeve and a ball bearing assembly.

| PATENT NO. | NAME | DATE |
|---|---|---|
| 2,422,775 | G. O. Connor | June 24, 1947 |
| 2,774,430 | W. J. Blazek | December 18, 1956 |
| 2,846,278 | W. T. Blazek | August 5, 1958 |
| 2,987,348 | W. T. Blazek | June 6, 1961 |
| 3,092,425 | G. O. Conner | June 4, 1963 |
| 3,357,755 | J. C. Danly | December 12, 1967 |
| 3,514,166 | S. E. Coley | May 26, 1970 |
| 3,752,540 | D. Bosworth | August 14, 1973 |
| 4,648,727 | J. O'Neil | March 10, 1987 |
| 4,664,534 | R. Hanaway | May 12, 1987 |

Previously with guide post, guide sleeve and ball bearing assemblies there was not known any means for positively assuring incremental rotary movements of the ball cage or ball bearing assembly with respect to the guide post and guide sleeve.

RELATED APPLICATION

Applicant's copending application, Ser. No. 802,825 filed Dec. 6, 1991 included a guide post, guide sleeve together with an air impulse rotary ball cage.

SUMMARY OF THE INVENTION

An important feature of the present invention is to provide in combination with a guide post, a guide sleeve and a ball bearing cage, with a mount means upon said sleeve to rotatably support for said ball cage.

As another feature there is provided mechanical or other means for effecting relative rotary movement of the ball cage with respect to the guide post and guide sleeve.

Another feature is to provide in combination with a guide post, a cylindrical ball bearing cage coaxially mounted thereon and adapted for relative longitudinal and rotary movements thereon. A guide sleeve is adapted to receive the cage and guide post. An apertured cap loosely receives the ball cage and is mounted over the guide sleeve. The cap has an inlet to its bore adapted for connection to a pressurized air source. The air source is adapted to direct pressurized air towards surface portions of the ball bearing cage to mechanically rotate the ball bearing cage on its axis.

As another feature there is provided within said cap an annular channel connected to said air inlet. A plurality of angularly related turbine passages receive pressurized air from said channel for impinging pressurized air at an acute angle to and around said cage for rotating said cage relative to said guide post and sleeve.

As another feature there is provided a normally closed valve means interposed upon a tube conducting pressurized air to said cap. The valve means when opened allows passage of compressed air to said turbine openings.

As a further feature the valve means may be in the form of a solenoid control valve or other air valve electrically controlled or may be a manual control valve.

As still another feature of the present invention there is incorporated within the cap which receives the ball bearing cage an air impeller assembly connected to a source of pressurized air, adapted for directing pressurized air at an acute angle to exterior surface portions of the ball cage for rotating the ball cage relative to said sleeve and post.

Another feature is to provide a timer within the electrical circuit to the air valve which is adjustable to predetermine the amount of rotative time the air valve will remain open, continued rotation of the ball bearing cage.

These and other features and objects will be seen from the following specification and claims in conjunction with the appended drawings.

THE DRAWINGS

FIG. 1 is a fragmentary vertical section of the present guide post, guide sleeve and ball cage assembly.

FIG. 2 is a fragmentary sectioned elevational view of a modification of the present guide post, guide sleeve and air impulse ball bearing assembly.

FIG. 3 is a section taken in the direction of arrows 3—3 of FIG. 2.

FIG. 4 is a fragmentary vertical section of a modification showing an air impulse ball bearing assembly with guide post and guide sleeve.

FIG. 5 is a plan section taken in the direction of arrows 5—5 of FIG. 4.

It will be understood that the above drawing illustrates several preferred embodiments of the invention, and that other embodiments are contemplated within the scope of the claims hereafter set forth.

DETAILED DESCRIPTION OF AN EMBODIMENT

In FIG. 1 portions of a die set assembly 13 are fragmentarily shown. The lower die shoe is fragmentarily shown at 15 and an upper die shoe is designated at 17. These are sometimes referred to as first and second supports. Guide sleeve 19, having a bore 25 and a central longitudinal axis 23 is press fitted into bore 21 formed in die shoe 17.

The axially aligned guide post 27 having a corresponding longitudinal axis 23 is press fitted within aperture 29 in lower die shoe 15. Cage 31, hereafter sometimes referred to as a ball bearing retainer, is of cylindrical form and includes a series of longitudinally spaced circles of spaced apertures 33 within which are nested and loosely retained a plurality of spaced ball bearings 35. The ball bearings are circularly arranged and project inwardly and outwardly respectively, of the ball cage and are engagable with post 27 and with the bore 25 of guide sleeve 19.

In normal operation the guide post, guide sleeve and ball bearing assembly are mounted with respect to die set 13. Suitable dies and punches, not shown, may be applied respectively to die shoes 15 and 17. The preload line 91, FIG. 4, extends transversely of the open end of cap 65. This corresponds to a preload condition wherein with relative movement of guide sleeve 19 downwardly with respect to guide post 27 and with respect to ball bearing cage 31, there is an oversize relationship of ball bearings 35 with respect to the guide post and guide sleeve. This is about one thousandths of an inch, for illustration. This creates a preload in the assembled relationship, FIG. 2.

For the purpose of the present disclosure during the phase of operation of the present impulse ball bearing cage and its rotation, there has been such relative movement between the die shoes 15 and 17 such that guide sleeve 19 has been lifted above preload line 91. At this position the ball cage 31 is not constrained frictionally against rotary movement.

The present ball bearing cage 31 includes a longitudinal bore 37, FIG. 1. Cap 39, includes an annular body having an axial bore 41 of the same diameter as bore 25 of sleeve 19. Cap 39 at one end terminates in an internal annular support flange 49 defining a stop shoulder or support 47.

A Teflon(TM) washer 51 is interposed between flange 49 and cage 31. Alternately stop shoulder 47 may be coated with Teflon(TM) plastic material, for lowering the friction with respect to the cage.

Apertured cap 39 has a threaded counterbore 43 threaded over threaded shank 45 on sleeve 19.

Cap 39, sometimes referred to as a cage mount means, is replaced by a ring 53, FIG. 2.

Said ring is fitted onto the one end of guide sleeve 19 and anchored by set screw 55.

Clip 57 at one end is secured to ring 53 by fastener 59. Its other end terminates in an inturned cage support flange 61. This limits relative movement of cage 31 in one direction relative to sleeve 19.

A modified guide post, guide sleeve and air impulse rotary ball cage assembly 63 is shown in FIG. 4 and 5.

The function and operation are shown in greater detail in my copending patent application Ser. No. 07/802,825 filed Dec. 6, 1991 entitled Guide Post, Guide Sleeve and Air Impulse Rotary Ball Cage.

Cap 65, FIG. 4, has a bore 67 terminating in a stop shoulder 69 defining an internal annular flange 71 supportably received cage 31, fragmentarily shown. The flange 71 is shown as annular in FIG. 4. It is contemplated that the arc of such flange could be less than 360° up to a limited flange such as shown at 61 in FIG. 2. This would be a limited and low friction support contact with the cage 31 employing the short flange 61, FIG. 2.

Formed within cap 65 are a plurality of angularly related angular passages 45, FIG. 5, which are arranged around said cap corresponding to the turbine ring described in the above copending patent application Ser. No. 07/802,825. In the illustrative embodiment these passages extend add an acute angle of 45° to a normal line 77 passing through axis 23. This is the preferred acute angle. Other acute angles may be employed as desired.

Formed within cap 67 is the radial outwardly extending annular stop flange 73.

A formed ring 79 is pressed over the surface of cap 65 to stop flange 73. Formed within the ring 79 is an annular channel 81 defining an air plenum in communication with the outer ends of the respective angular air passages 75.

Plug fitting 87 projects into ring 79 on cap 65 and includes a pipe thread, FIG. 4. A pressurized air supply 83, FIG. 4, generates pressures in the range of 60 to 100 psi. In the illustrative embodiment this is 80 psi. Said air source is connected to air hose 85. The hose in the illustrative embodiment is constructed of a polyethylene plastic material.

The air supply hose 85 at one end includes a fitting 87, which is threaded into ring 79 for communicating pressurized air to channel 81.

The annular channel 81, FIGS. 4 and 5, defines an annular plenum chamber 69 in communication with the impeller type angular passages or openings 75, FIG. 5.

The plurality of angularly related turbine openings 75 receive pressurized air from channel 81 and 79 deliver said air at an acute angle to and around the surface of cage 31. This rotates said cage relative to sleeve 19 and guide post 27.

The normally closed solenoid control valve 89, sometimes referred to as an air valve, FIG. 4, is interposed within air hose 85. Said valve controls and permits the flow of pressurized air from source 83 to and through ring channel 81 and through the corresponding angular passages 75 for impingement of pressurized air upon exterior surface portions of ball cage 31. This effectively rotates the ball cage, counterclockwise, in the illustrative embodiment.

Air valve 89 is connected into circuit 93, FIG. 4, including electrical power source 95, 120 volts, AC.

Interposed in pipe 85 replacing valve 93 may be a manual air control valve. Air through hose 85 may be controlled by manual application for maintaining the air flow for the number of seconds desired. This affects a random rotation of ball bearing assembly 31 with respect to guide sleeve 19 and guide post 27. Controlling valve 89 is an adjustable timer on 03 that can be preset. This is fully discussed in my copending patent application Ser. No. 07/802,825 filed Dec. 6, 1991. Technical circuit 93, FIG. 6, includes normally open counterswitch 99, which can be preset to close after there has been a predetermined number of relative movements between upper die shoe 17 and lower die shoe 15, FIG. 1. This includes corresponding movements between guide post 27 and guide shoe 19.

For example, the counterswitch 99 may be set for 100 such reciprocations. After that, the counterswitch closes to partly close electrical circuit 75 to air valve 89.

Connected to circuit 93 is a normally opened proximity switch 101 or equivalent switch. Said switch is positioned adjacent a portion of the upper die shoe 17, when in its uppermost position relative to die shoe 15, FIG. 4, relative to preload line 91.

Adjustable normally closed timer switch 103, FIG. 6, is preset for a predetermined number of seconds as desired for the flow of pressurized air into cap 79, FIG. 4. This regulates the duration of air flow and continued rotation of ball cage 31, if valve 89 is open.

Air valve 89 is automatically reset by timer 105.

Counterswitch 9, FIG. 6, is identified as a RED LINE GEMINI 1000 Counter, Model No. GEM-10-000/A, manufactured by Red Lie Co., York, Pa.

Proximity switch 81, is referred to as effector proximity switch, model no. 8036AL15NL3DABX, manufactured by Effector Co., King of Prussia, Pa.

The air valve 89, referred to as Asco air valve, is identified as model no. 8210B20-120V.AC/60 cycle, manufactured by Automatic Switch Company, Florham Park, N.J.

By the present construction there will be an intermittent rotation of the ball bearing assembly 31 one or a plurality of rotations or for a portion of a rotation. The effect of this rotation is that it provides a means of reducing tracking of the balls in the ball bearing cage with respect to the guide sleeve and guide post. This provides for less wear of the guide post, guide sleeve and cage and a longer service life of the assembly.

Having described my invention, reference should now be had to the following claims.

I claim:

1. In combination, a first support; a guide post having a longitudinal axis mounted upon said support; a cylindrical ball bearing cage having a coaxial bore adjustably receiving said guide post; said cage mounting a plurality of longitudinally spaced circularly arranged ball bearings extending substantially the length of said cage and projecting inwardly and outwardly thereof, for engagement with said post and a guide sleeve respectively; a second support spaced from said first support; a guide sleeve having a coaxial bore mounted upon said second support and depending therefrom; and a cage mount means upon and depending from said sleeve and extending radially inward of said sleeve bore rotatably supporting said cage and against movement in one direction along said axis; said cage and guide post being projected into said sleeve for relative longitudinal movements and for rotary movements of said cage relative to said guide post and sleeve.

2. In the combination of claim 1, further comprising: said first and second supports being the relatively movable lower and upper die shoes of a die set assembly; and said guide post and sleeve being upright and at their ends projected into and respectively secured within said die shoes.

3. In the combination of claim 1, further comprising a low friction washer interposed between said cage mount means and cage.

4. In the combination of claim 3, further comprising said washer being of Teflon TM material.

5. In the combination of claim 5, further comprising said cage projecting outwardly of said sleeve; said cage mount means including an apertured cap having a bore and threaded onto one end of said sleeve, and an internal radial flange on said cap supporting said cage.

6. In the combination of claim 5, further comprising said cap having an air inlet adapted for connection to a compressed air source; and an annular chamber within said cap defining a plenum connected to said air inlet; there being a plurality of angularly related turbine openings in said cap for receiving pressurized air from said plenum and impinging pressurized air at an acute angle to and around said cage for rotating said cage relative to said sleeve and post.

7. In the combination of claim 6, further comprising said connection including a hose with a fitting at one end connected to said cap inlet and at its other end connected to said air source.

8. In the combination of claim 7, further comprising said air source being compressed air at a pressure in the range of about 60 to 100 PSI.

9. In the combination of claim 7, further comprising a normally closed valve means interposed upon said hose, said valve means when open feeding compressed air to said turbine openings.

10. In the combination of claim 9, further comprising the valve means being a solenoid control valve.

11. In the combination of claim 6, further comprising said turbine openings being arranged at an angle of 45°, approximately, to a normal line extending through said axis.

12. In the combination of claim 6, further comprising said guide sleeve being sufficiently elevated relative to said guide post and cage so as to release any preload therebetween.

13. In the combination of claim 5, further comprising said radial flange being annular.

14. In the combination of claim 5, further comprising said cap being constructed of a material selected from the group consisting of metal and plastic.

15. In the combination of claim 5, further comprising said cage mount means including a ring secured over one end of said sleeve; and a support member depending from said ring having a radial cage support flange.

16. In the combination of claim 5, further comprising said sleeve having a threaded shank of reduced diameter relative to said sleeve diameter; said cap being of the same diameter of said sleeve and having a counterbore threaded over said shank.

17. In the combination of claim 5, further comprising said cap having a bore of the same diameter as said sleeve providing a smooth continuation thereof receiving said cage.

18. In combination, a first support; a guide post having a longitudinal axis mounted upon said support; a cylindrical ball bearing cage having a coaxial bore adjustably receiving said guide post; said cage mounting a plurality of spaced circularly arranged ball bearings extending substantially the length of said cage and projecting inwardly and outwardly thereof, respectively; a second support spaced from said first support; a guide sleeve having a coaxial bore mounted upon and depending from said second support; a cap threaded onto one end of said sleeve and having an annular flange rotatably supporting said cage; said cap having an air inlet connected to its bore adapted for connection to a compressed air source; and a plurality of angularly related turbine openings in said cap for receiving pressurized air from said inlet and impinging pressurized air an acute angle to and around said cage for rotating said cage relative to said sleeve and post.

19. In the combination of claim 18, further comprising said connection including a tube with a fitting at one end connected to said cap inlet and at its other end connected to said air source; and a normally closed valve means interposed upon said tube, said valve means when open feeding compressed air to said turbine openings.

* * * * *